(12) United States Patent
Kim et al.

(10) Patent No.: US 8,682,374 B2
(45) Date of Patent: Mar. 25, 2014

(54) MOBILE TERMINAL AND CONTROLLING METHOD THEREOF

(75) Inventors: Tae Jun Kim, Seoul (KR); Jong Keun Youn, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 687 days.

(21) Appl. No.: 12/816,204

(22) Filed: Jun. 15, 2010

(65) Prior Publication Data

US 2010/0331051 A1 Dec. 30, 2010

(30) Foreign Application Priority Data

Jun. 30, 2009 (KR) ........................ 10-2009-0059120

(51) Int. Cl.
*H04B 7/00* (2006.01)
(52) U.S. Cl.
USPC ....... 455/518; 455/90.2; 455/414.1; 455/450; 370/296
(58) Field of Classification Search
USPC ............... 455/518, 90.2, 414.1, 450; 370/296
See application file for complete search history.

(56) References Cited

U.S. PATENT DOCUMENTS

| 2008/0020806 A1* | 1/2008 | Iwase .......................... 455/569.1 |
| 2008/0063156 A1* | 3/2008 | Grohn et al. ............... 379/88.16 |

FOREIGN PATENT DOCUMENTS

EP 1 973 315 A1 9/2008

* cited by examiner

*Primary Examiner* — Shaima Q Aminzay
(74) *Attorney, Agent, or Firm* — Birch, Stewart, Kolasch & Birch, LLP

(57) ABSTRACT

A mobile terminal and controlling method thereof are disclosed. According to the present invention, when audio information including recorded voice of a correspondent party is displayed on a screen of a mobile terminal, contact information matching the audio information of the correspondent party stored in the mobile terminal is searched and displayed on the screen. Therefore, a user is able to directly contact the correspondent party having recorded the audio information within the screen.

13 Claims, 14 Drawing Sheets

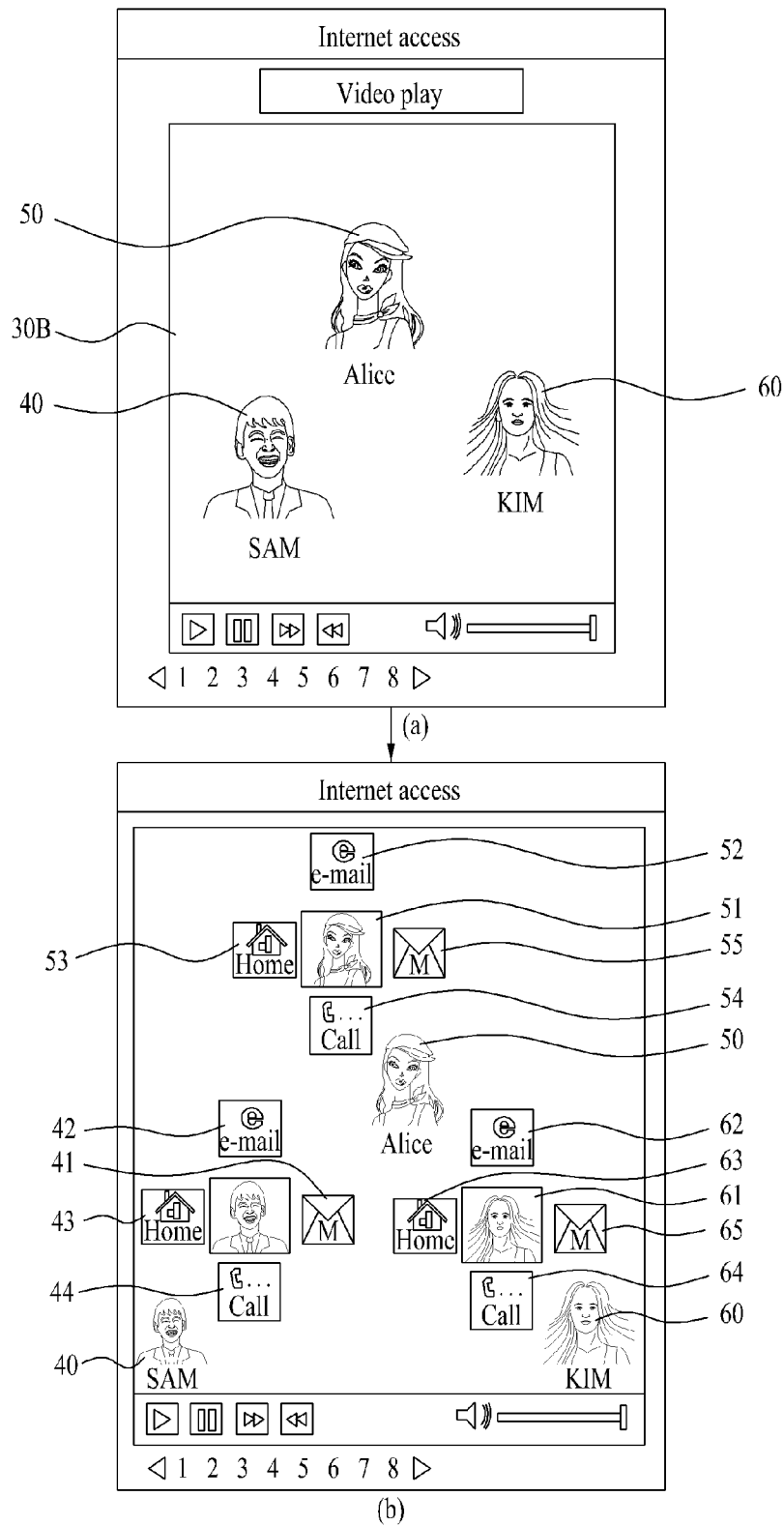

MOBILE TERMINAL AND CONTROLLING METHOD THEREOF

Pursuant to 35 U.S.C. §119(a), this application claims the benefit of earlier filing date and right of priority to Korean Application No. 10-2009-0059120, filed on Jun. 30, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, such a web service as a homepage, a website, a webpage, a blog, an SNS (social network service) and the like is ongoing to support or further develop a function of enabling a user to register a voice post of recording user's speech or a voice reply.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. In particular, when audio information including recorded voice of a correspondent party is displayed on a screen of a mobile terminal, contact information matching the audio information of the correspondent party stored in the mobile terminal is searched and displayed on the screen. Therefore, a user is able to directly contact the correspondent party having recorded the audio information within the screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit, a display unit configured to display a screen including at least one audio information, an audio output unit configured to output the audio information included in the screen, a memory configured to store a plurality of contact informations including voice information of a correspondent party, and a controller configured to analyze the at least one audio information included in the screen, to search the memory for at least one contact information including the voice information matching the analyzed audio information, and to display the searched contact information on the picture.

In another aspect of the present invention, a method of controlling a mobile terminal according to the present invention includes the steps of displaying a screen including at least one audio information, analyzing the at least one audio information included in the screen, searching a memory storing a plurality of contact informations including voice information of a correspondent party for at least one contact information including the voice information matching the analyzed audio information, and displaying the searched contact information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 9 to 16 are diagrams for screen configurations of a process for searching and displaying contact information, to which voice information corresponding to audio information included in a screen is tagged, according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
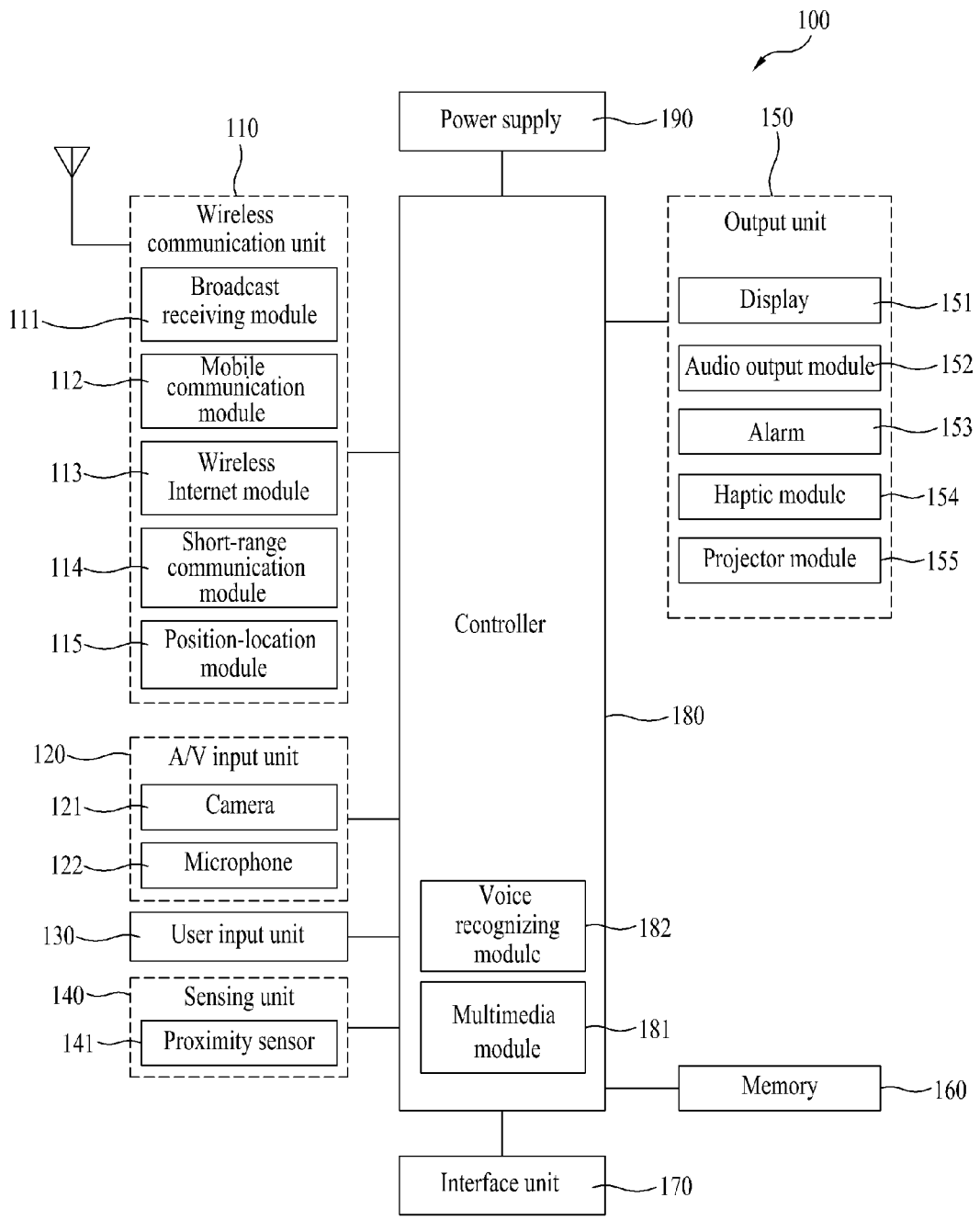
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA(High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, the memory 160 is provided with a phonebook including a plurality of contact informations containing voice information of a correspondent party.

The contact information includes correspondent party's voice information, correspondent party's image, correspondent party's phone number, correspondent party's fax number, correspondent party's email address, correspondent party's blog address, correspondent party's homepage address and various contacts.

In this case, a whole voice file including correspondent party's recorded voice can be stored in the contact information. In order to increase storage capacity of the memory 160, a correspondent party's voice feature vector value extracted via the voice recognizing module 182 can be stored in the memory 160 instead of storing the whole voice file.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A voice recognizing module 182 recognizes user's voice inputted via the microphone 122 by driving a voice recognizing engine having voice recognition algorithm applied thereto.

In particular, the voice recognizing module 182 converts the user's voice inputted via the microphone 122 to digital data and then pre-emphasizes the digital data.

Subsequently, the voice recognizing module 182 extracts voice feature vector values of the digital-converted voice. And, a voice recognition database provided to the memory 160*n* informs the controller 180 of the operation that matches the extracted voice feature vector values.

In this case, the voice feature vector values can include at least one of a waveform of the voice, a format of the voice and a pitch of the voice.

For instance, if the operation matching the voice feature vector value extracted from the voice recognition database by the voice recognizing module 182 is 'phonebook', the controller 180 executes a phonebook menu function and displays a phonebook menu on a screen of the display 151.

If the operation matching the voice feature vector value extracted from the voice recognition database by the voice recognizing module 182 is 'text', the controller 180 drives a text viewer application for displaying the 'text' and displays a text viewer image on a screen of the display 151.

Under the control of the controller 180, the voice recognizing module 182 recognizes correspondent party's voice inputted via the microphone 122 by driving a voice recognition engine having voice recognition algorithm applied thereto.

If a correspondent party's voice recognition command is inputted in the course of a call with the correspondent party, the voice recognizing module 182 recognizes a correspondent party's call voice outputted via the audio output module 152 under the control of the controller 180.

If a command for recognizing correspondent party's voice included in a music file in the course of playback is inputted, the voice recognizing module 182 recognizes the correspondent party's voice within the music file outputted to the audio output module 152 under the control of the controller 180.

If a command for recognizing correspondent party's voice included in a video file in the course of playback is inputted, the voice recognizing module 182 recognizes the correspondent party's voice within the video file outputted to the audio output module 152 under the control of the controller 180.

Under the control of the controller 180, the voice recognizing module 182 extracts voice feature vector values for the recognized voice of the correspondent party and then attaches the extracted voice feature vector values to contact informations provided to the memory 160, respectively.

Under the control of the controller 180, the voice recognizing module 182 recognizes audio information included in a current screen, extracts feature vector values for the recognized audio information, and then searches the contact informations provided within the memory 160 for the contact information containing the voice information that matches the extracted voice feature vector value.

In this case, the screen can include a website screen, a music play screen and a video play screen.

And, the audio information included in the website screen can include one of a correspondent party's voice post, a correspondent party's voice reply and a UCC (user created contents) video containing a voice of the correspondent party.

The above-configured voice recognizing module 182 is provided as a module or unit to the mobile terminal 100 or can be provided as software to the memory 160.

The voice recognizing module 182 can be provided within the controller 180. In this case, the controller 180 is able to identically perform operations of the voice recognizing module 182.

In the following description, assume that the voice recognizing module 182 is provided within the controller 180 and identically performs operations of the voice recognizing module 182.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
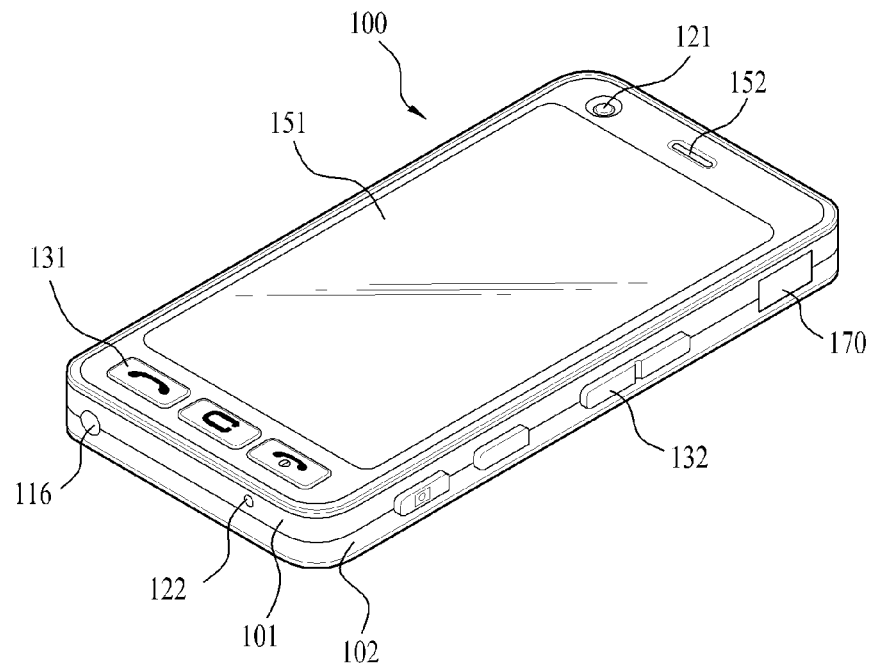
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
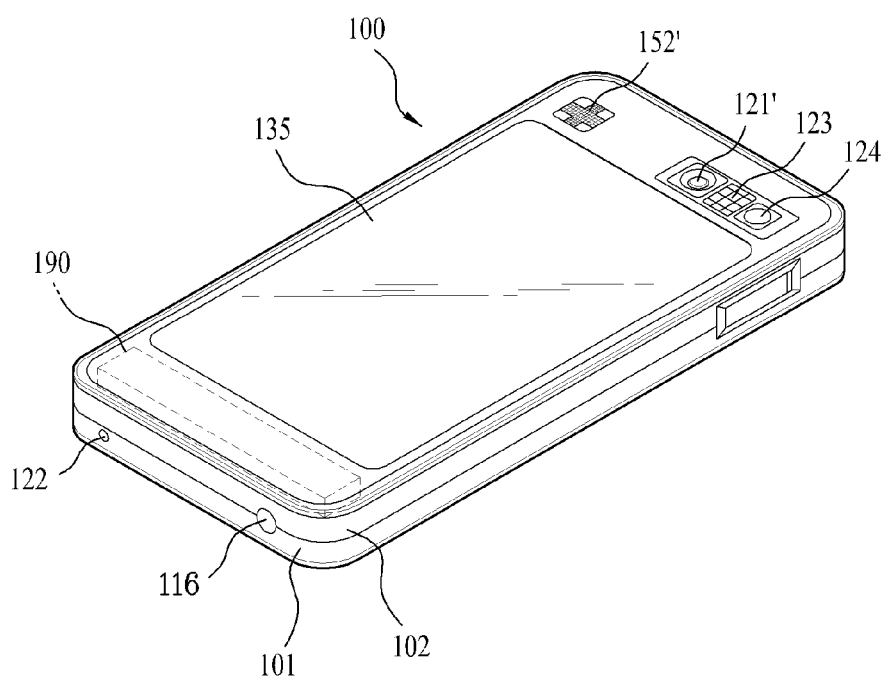
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

A mobile terminal and controlling method thereof according to the present invention are described in detail with reference to the accompanying drawings as follows.

First of all, a process for tagging correspondent party's voice information into contact information is explained in detail with reference to FIGS. 3 to 7 as follows.

Figure 3:
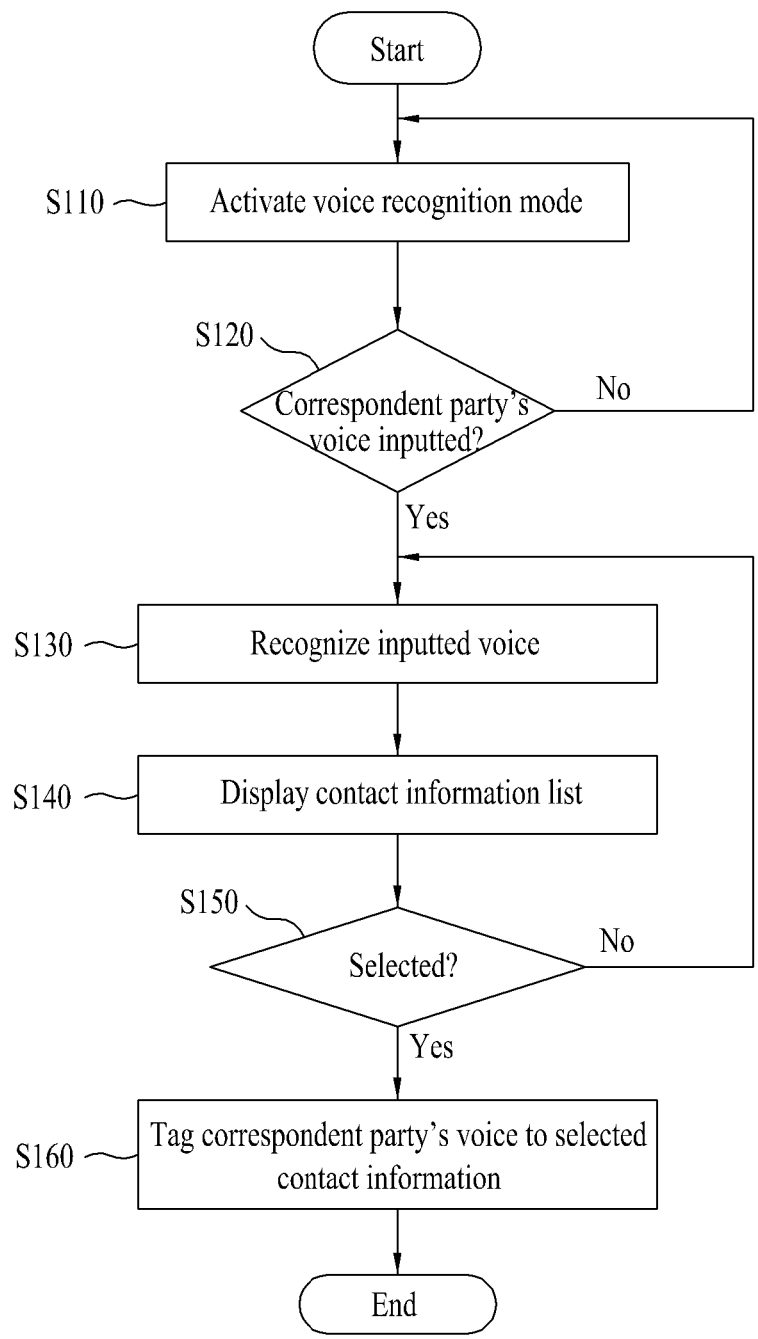
FIG. 3 is a flowchart of a process for tagging voice information of a correspondent party into contact information according to one embodiment of the present invention.

FIG. 3 is a flowchart of a process for tagging voice information of a correspondent party into contact information according to one embodiment of the present invention, and FIGS. 4 to 7 are diagrams for screen configurations of a process for tagging voice information of a correspondent party into contact information according to one embodiment of the present invention.

Referring to FIG. 3, if a command for tagging correspondent party's voice to corresponding contact information is inputted by a user via the user input unit 130 or the touchscreen 151, the controller 180 of the mobile terminal 100 activates a voice recognition mode and drives the voice recognizing module 182 [S110].

If the correspondent party's voice is inputted [S120], the controller 180 recognizes the inputted voice via the voice recognizing module 182 [S130].

In this case, as mentioned in the foregoing description of the voice recognizing module 182 shown in FIG. 1, the inputted correspondent party's voice can include one of a voice inputted via the microphone 122, a voice received in the course of a call, a voice extracted from a currently reproduced music file, a voice extracted from a currently reproduced video file, a voice extracted from a currently played broadcast, and the like.

Moreover, the music file, the video file or the broadcast, from which the correspondent party's voice is extracted, can include data provided within the memory 160 or data registered with a web.

As mentioned in the foregoing description, once the correspondent party's voice is recognized via the voice recognizing module 182, the controller 180 displays a contact information list on a screen to enable a user to tag the recognized voice information to the contact information within a phonebook [S140].

If the contact information, to which the recognized voice information will be tagged, is selected from the displayed contact information list [S150], the controller 180 stores the recognized voice information in the memory 160 and then tags the recognized voice information into the selected contact information [S160].

In this case, the controller 180 stores the whole of the recognized voice information in the memory 160 or stores a feature vector of the recognized voice information to efficiently manage storage capacity of the memory 160.

The procedure for tagging the correspondent party's voice information into the corresponding contact information is further explained in detail with reference to FIGS. 4 to 7 as follows.

Figure 4:
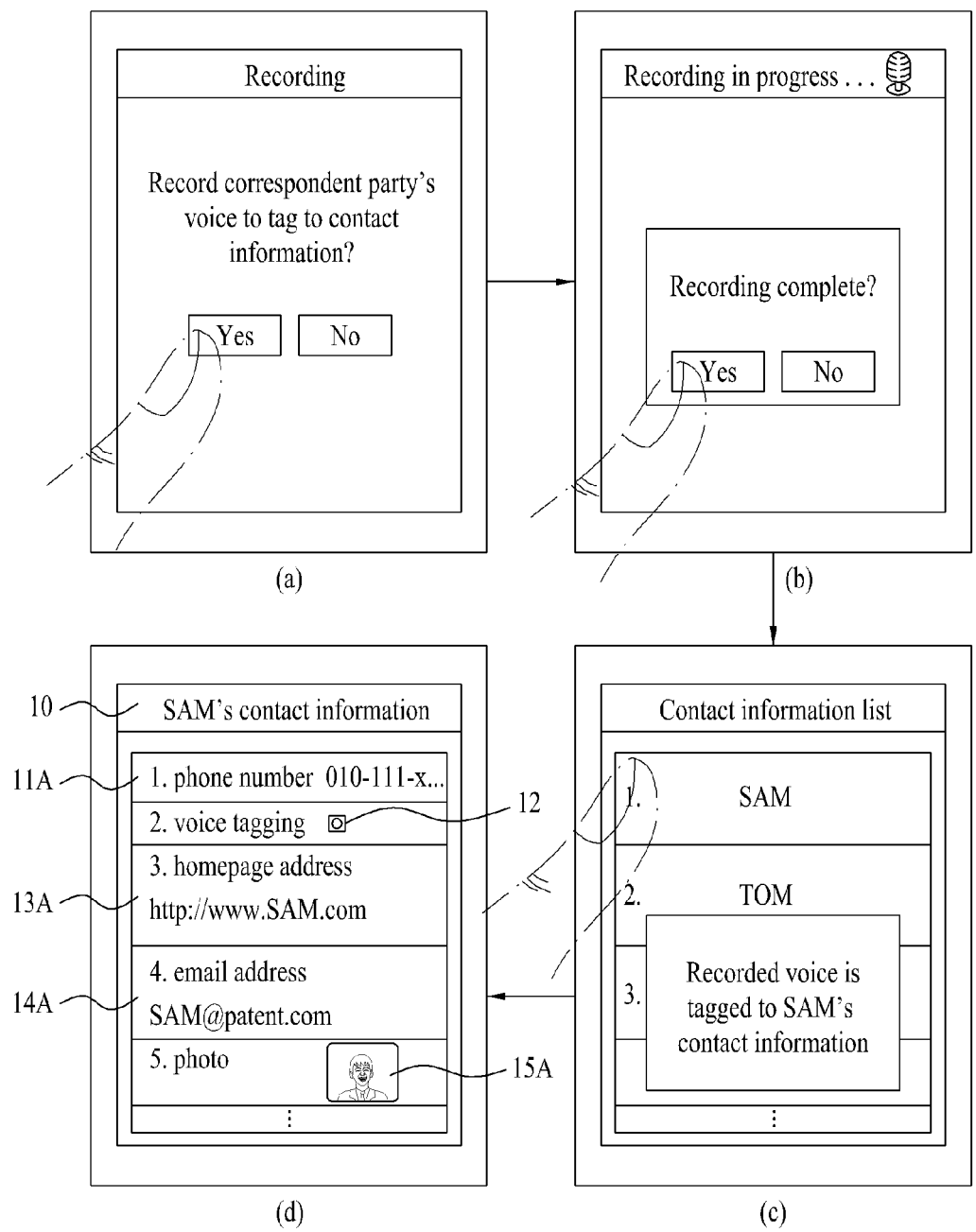
FIGS. 4 to 7 are diagrams for screen configurations of a process for tagging voice information of a correspondent party into contact information according to one embodiment of the present invention.

FIG. 4 shows a procedure for recognizing correspondent party's voice inputted via the microphone 122 and then tagging into the corresponding contact information.

Referring to (a) of FIG. 4, a command for recognizing correspondent party's voice, which will be tagged to the corresponding contact information, is inputted via the user input unit 130 or the touchscreen 151.

Referring to (b) of FIG. 4, if the command is inputted, the controller 180 activates the microphone 122. If a command for recording the correspondent party's voice inputted via the microphone is inputted by a user, the controller 180 records the correspondent party's voice and then recognizes feature vector values of the recorded voice via the voice recognizing module 182.

Besides, the controller 180 is able to directly recognize the voice inputted to the microphone 122 through the voice recognizing module 182 without the recording of the correspondent party's voice.

Referring to (c) of FIG. 4, the controller 180 displays a contact information list on the screen to enable the user to tag the recognized voice information to the contact information within a phonebook. If the user selects a specific contact information 'SAM', as shown in (d) of FIG. 4, the controller 180 stores the recognized voice information in the memory 160 and then tags the recognized voice information into the selected contact information 'SAM'.

In (d) of FIG. 4, shown is the correspondent party's contact information 10 to which the correspondent party's voice information is tagged.

Referring to (d) of FIG. 4, the contact information 10 of the present invention includes the tagged correspondent party's voice information 12, a phone number 11A of the correspondent party, a homepage address 13A (blog address, SNS address, or the like) of the correspondent party, an email address 14A of the correspondent party, a photo 15A of the correspondent party, and the like. Occasionally, a fax number, a home phone number and the like can be further included in the contact information 10.

In this case, the controller 180 is able to represent the voice information 12 tagged into the contact information as an icon 12.

If the icon 12 is selected from the contact information 10, the controller 180 is able to output the correspondent party's voice corresponding to the icon 12 via the audio output module 152.

If the icon 12 is selected from the contact information 10, the controller 180 converts the correspondent party's voice corresponding to the selected icon 12 to a text using a TTS (text to speech) application provide to the memory 160 and is then able to display the corresponding text.

Figure 5:
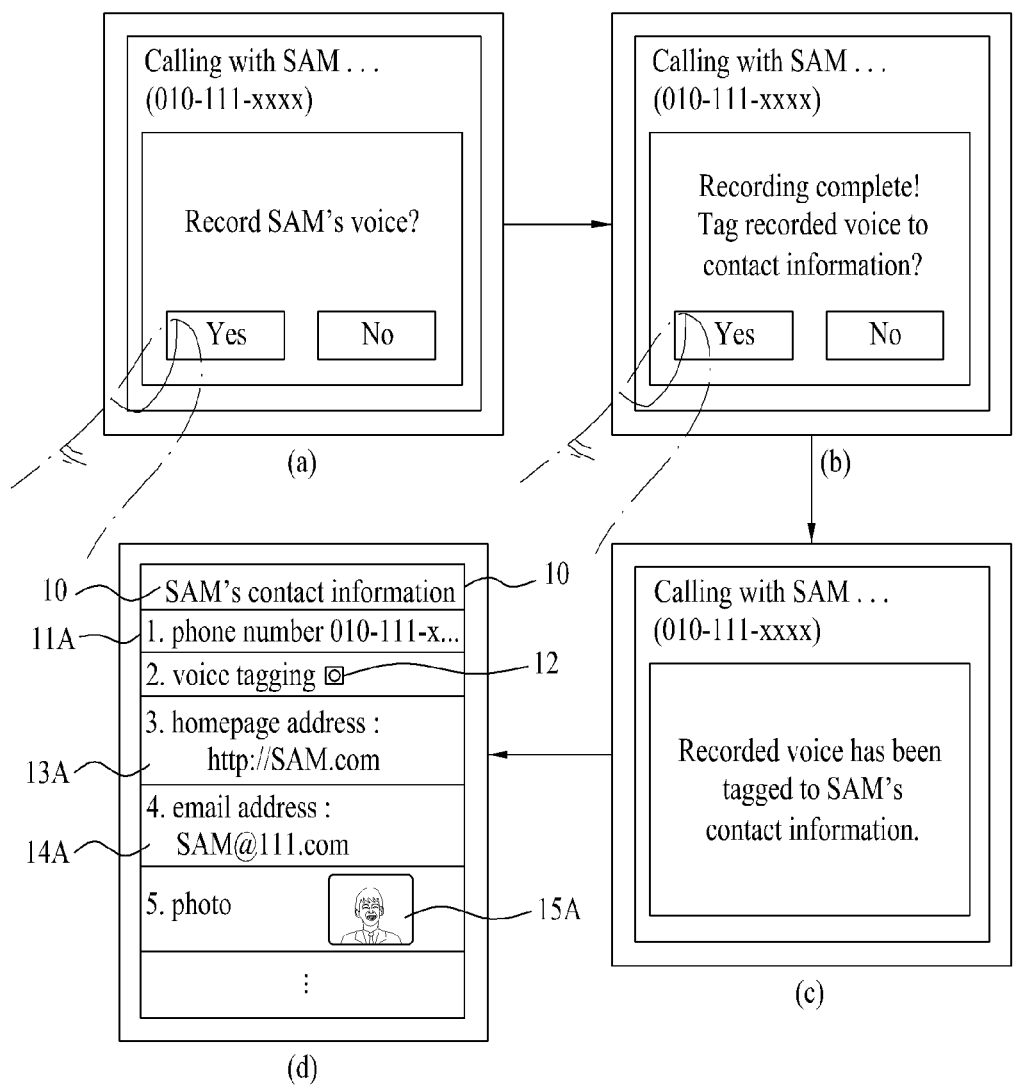

FIG. 5 shows a procedure for recognizing correspondent party's voice received in the course of calling a correspondent party and then tagging the recognized voice into corresponding contact information.

Referring to (a) of FIG. 5, a command for recognizing correspondent party's voice is inputted via the wireless communication unit 110 in the course of performing an operation of the call with a terminal of the correspondent party.

Referring to (b) of FIG. 5, if the command is inputted, the controller 180 activates the voice recognizing module 182 and then records the correspondent party's call voice outputted via the audio output unit 152.

In doing so, while the correspondent party's call voice is recorded, if a command for tagging the recognized voice information is inputted by a user, referring to (c) of FIG. 5, the controller 180 tags the recognized voice information into the contact information 10 corresponding to the correspondent party.

Besides, the controller 180 is able to directly recognize the correspondent party's call voice received via the wireless communication unit 110 without the recording of the correspondent party's voice.

In (d) of FIG. 5, like (d) of FIG. 4, shown is the correspondent party's contact information 10 to which the correspondent party's voice information is tagged.

An operational procedure shown in (d) of FIG. 5 is identical to that shown in (d) of FIG. 4 and its details are omitted from the following description.

Figure 6:
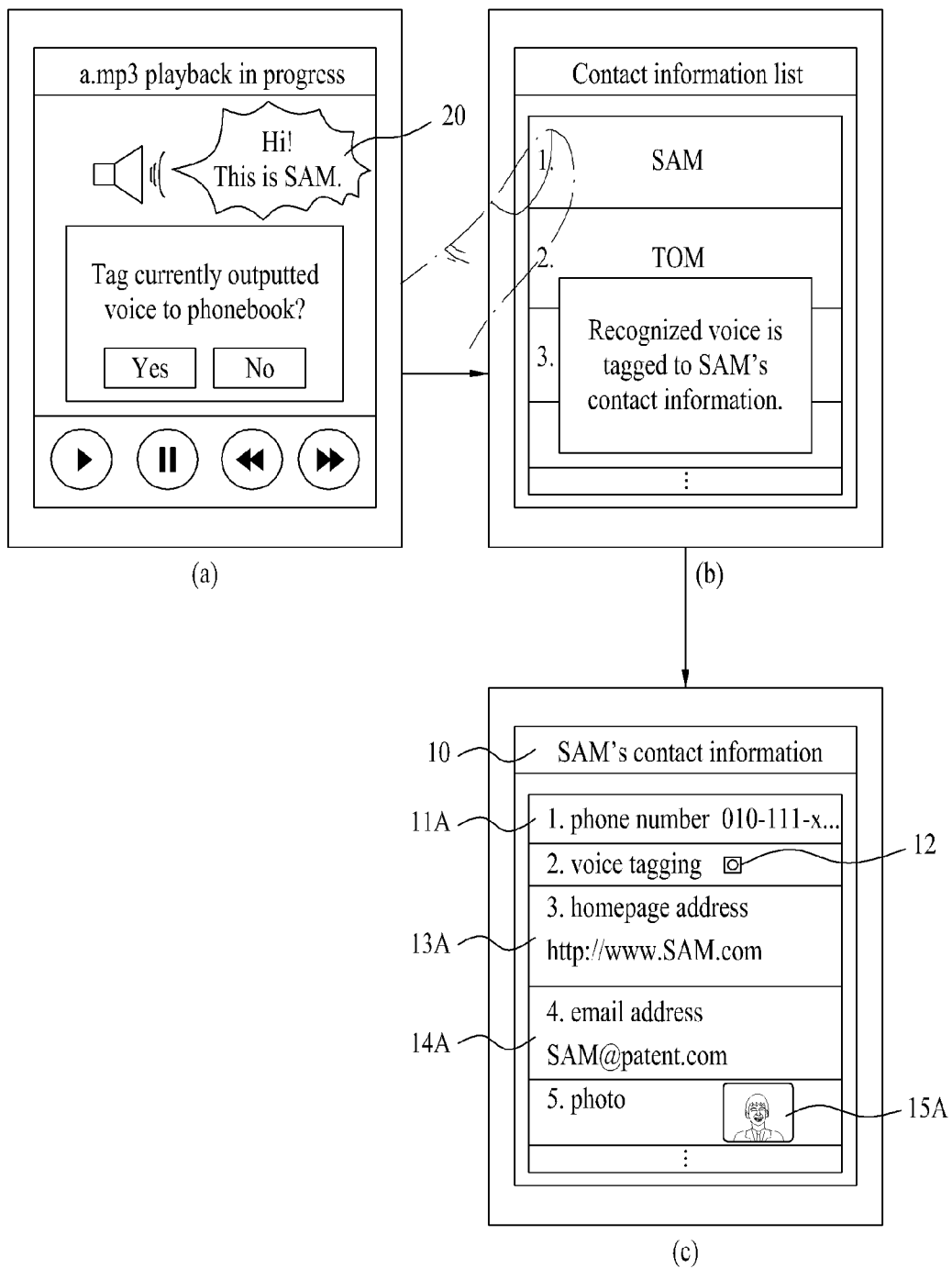

FIG. 6 shows a procedure for recognizing correspondent party's voice included in a currently reproduced music file and then tagging the recognized voice into corresponding contact information.

Referring to (a) of FIG. 6, while a music file 'a.mp3' selected by a user is being played back, if a user inputs a command for recognizing a correspondent party's voice 20 included in the music file 'a.mp3', the controller 180 recognizes the correspondent party's voice 20 included in the music file 'a.mp3' via the voice recognizing module 182. Referring to (b) of FIG. 6, the controller 180 then displays a contact information list on the screen to enable the user to tag the recognized voice information 20 to the contact information within the phonebook.

In doing so, if the user sets an interval having the voice 20 included therein in a playback interval of the music file a.mp3, the controller 180 is able to recognize the voice 20 included in the interval.

Referring to (b) of FIG. 6, the user selects specific contact information 'SAM' from the list.

If so, referring to (c) of FIG. 6, the controller 180 stores the recognized voice information 20 in the memory 160 and then tags the recognized voice information 20 into the selected contact information 'SAM'.

Figure 7:
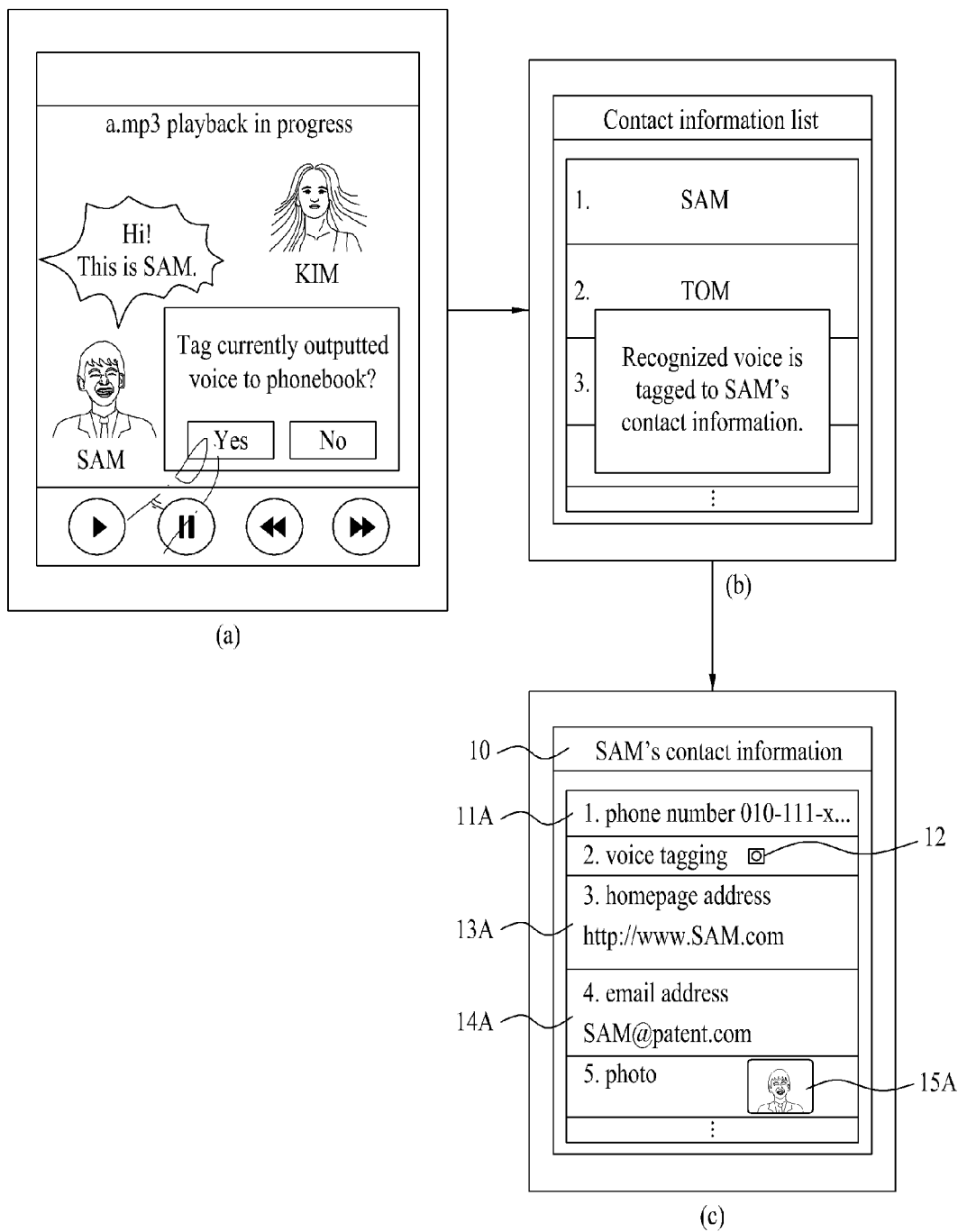

FIG. 7 shows a procedure for recognizing correspondent party's voice included in a currently reproduced video file and then tagging the recognized voice into corresponding contact information.

Referring to (a) of FIG. 7, while a video file 'b.avi' selected by a user is being played back, if a user inputs a command for recognizing a voice of a correspondent party 'SAM' included in the video file 'b.avi', the controller 180 recognizes the correspondent party's voice (SAM's voice) included in the video file 'b.avi' via the voice recognizing module 182. Referring to (b) of FIG. 7, the controller 180 then displays a contact information list on the screen to enable the user to tag the recognized voice information of the correspondent party (SAM) to the contact information within the phonebook.

In doing so, if the user sets an interval having the correspondent party's (SAM's) voice included therein in a playback interval of the video file b.avi, the controller 180 is able to recognize the correspondent party's (SAM's) voice included in the interval.

Referring to (b) of FIG. 7, the user selects specific contact information 'SAM' from the list.

If so, referring to (c) of FIG. 7, the controller 180 stores the recognized voice information in the memory 160 and then tags the recognized voice information into the selected contact information 'SAM'.

So far, the processes for tagging the correspondent party's information into the contact information are explained in detail with reference to FIGS. 3 to 7.

In the following description, a procedure for searching the memory 160 for contact information, to which voice information matching audio information included in a screen is tagged, and displaying the searched contact information is explained in detail with reference to FIGS. 8 to 16.

Figure 8:
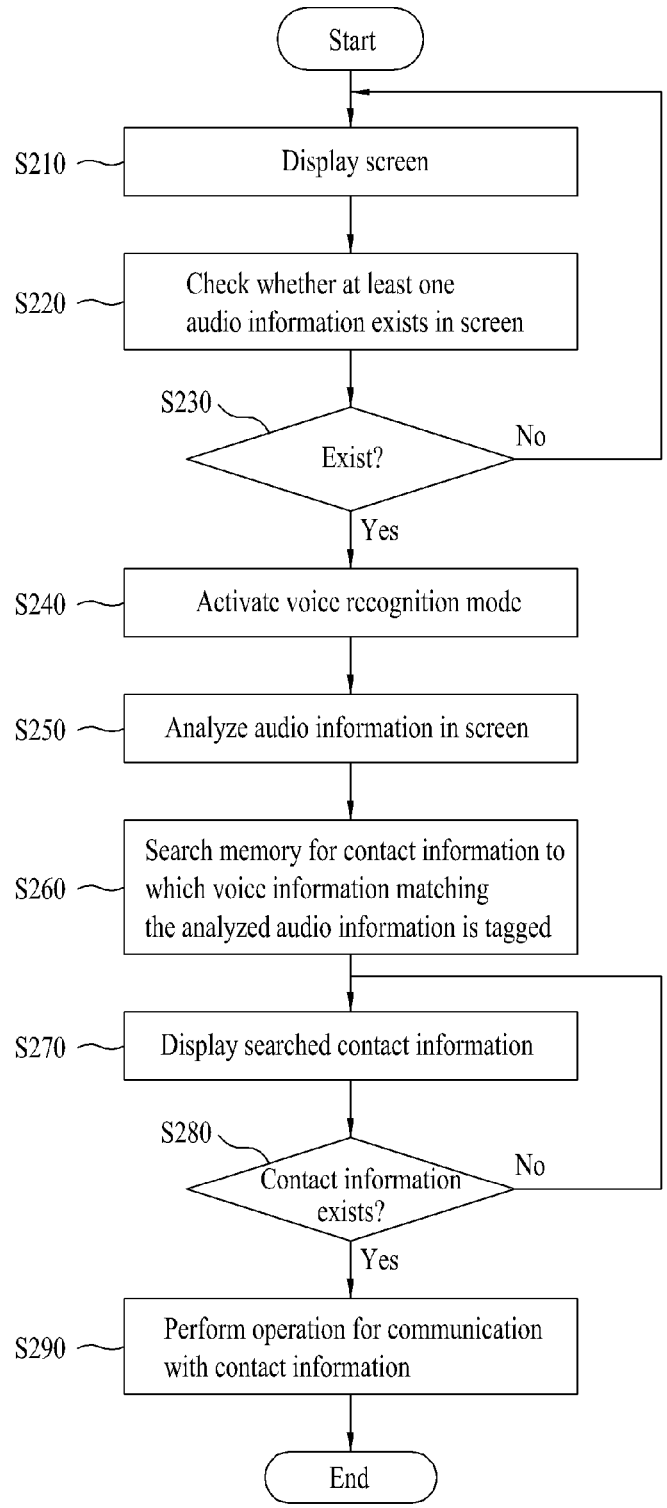
FIG. 8 is a flowchart of a process for searching and displaying contact information, to which voice information corresponding to audio information included in a screen is tagged, according to one embodiment of the present invention.

FIG. 8 is a flowchart of a process for searching and displaying contact information, to which voice information corresponding to audio information included in a screen is tagged, according to one embodiment of the present invention; and FIGS. 9 to 16 are diagrams for screen configurations of a process for searching and displaying contact information, to which voice information corresponding to audio information included in a screen is tagged, according to one embodiment of the present invention.

Referring to FIG. 8, if a screen is displayed on the touch-screen 151 [S210], the controller 180 checks whether at least one audio information exits in the screen [S220].

In this case, the audio information included in the screen can include a multimedia file including audio stored in the memory 160. And, the controller 180 s able to checks whether the multimedia file including the audio exists within the screen.

Moreover, the screen can include a screen of a website with which the at least one audio information has registered. If the screen is the website screen, the audio information included in the website screen can include one of a correspondent party's voice post, a correspondent party's voice reply, a correspondent party's UCC (user created contents) video and the like.

And, the website can include such a site for a user to record and upload a personal post, a personal replay and the like using user's voice as a personal blog, a personal homepage, a community site, a portal site and the like. Moreover, the website can include every site to which a personal UCC (user created contents) video can be uploaded.

If the screen is the website screen, the controller 180 analyzes source information of the website screen. If the audio information is registered within the analyzed source information, the controller 180 is able to determine that the audio information exists within the website screen.

Thus, if at least one audio information exists within the screen[S230], the controller 180 activates a voice recognition mode for recognizing the audio information registered within the screen and then activates the voice recognizing module 182 [S240].

If a command for voice recognition of the audio information included in the screen is inputted by a user, the controller 180 skips the step 220 and the step S230 and is then able to directly enter the step S240.

The controller 180 analyzes the audio information within the screen via the activated voice recognizing module 182 [S250]. The controller 180 searches the memory 160 for at least one contact information, to which voice information matching the analyzed audio information is tagged, among contact informations to which the voice information is tagged by the procedures shown in FIGS. 3 to 7 [S260]. The controller 180 then displays the searched contact information at the position of the analyzed audio information in the screen [S270].

In particular, the controller 180 analyzes the audio information within the screen and then extracts voice feature vector values from the audio information. Subsequently, the controller 180 searches the voice information tagged contact informations in the memory 160 for the contact information to which the voice information matching the extracted voice feature vector values is tagged.

In doing so, if a plurality of the contact informations, to which the voice information matching the analyzed audio information is tagged, are searched from the memory 160, the controller 180 is able to display the searched contact informations according to preset order of significance, priority and/or use frequency.

When a plurality of audio informations are included in the screen, if contact informations, in which voice informations respectively matching the audio informations are included, are searched from the memory 160, the controller 180 displays the searched contact informations at the positions of the corresponding audio informations, respectively.

If the contact information, to which the voice information matching the analyzed audio information is tagged, is no searched from the memory 160, the controller 180 accesses a web via the wireless communication unit 110.

Subsequently, the controller 180 searches the accessed web for the contact information including the voice information matching the analyzed audio information and then downloads the searched contact information. The controller 180 is then able to display the downloaded contact information at the position of the analyzed audio information.

For instance, when the analyzed audio information includes 'A mart in Washington D.C.', if the contact information (703-577-xxxx) including the 'A mart in Washington D.C.' is searched from the web, the controller 180 downloads the contact information (703-577-xxxx) and then displays the downloaded contact information (703-577-xxxx) at the position of the audio information 'A mart in Washington D.C.'.

Meanwhile, if the contact information, to which the voice information matching the analyzed audio information is tagged, is searched from the memory 160, the controller 180 can display at least one icon indicating the searched contact information at the position of the analyzed audio information.

Figure 10:
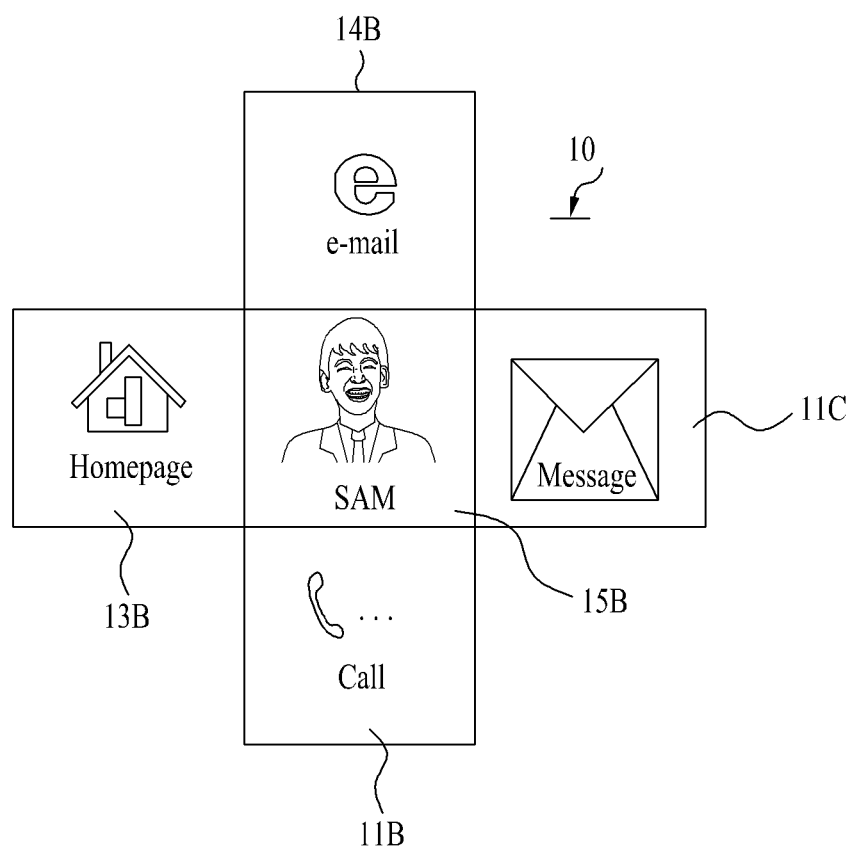
Figure 11:
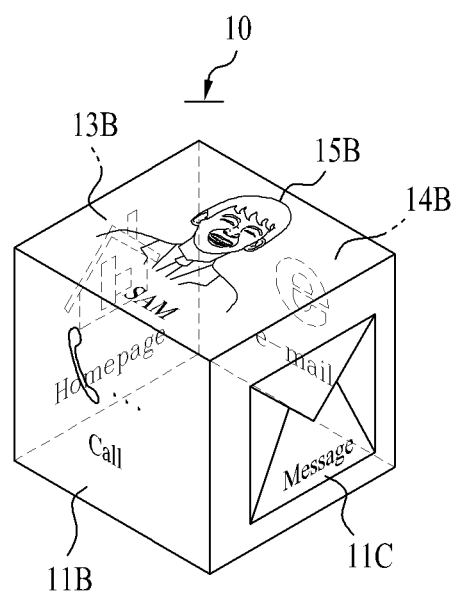

For instance, if a correspondent party's phone number, a correspondent party's homepage address, a correspondent party's email address and a correspondent party's photo, as shown in (d) of FIG. 4, are set in the searched contact information, the controller 180 displays a first icon 11B for a call connection to the correspondent party's phone number, a second icon 11C for sending a message to the correspondent party's phone number, a third icon 13B for accessing the correspondent party's home page address, a fourth icon 14B for sending an email to the correspondent party's email address, and a fifth icon 15B indicating the correspondent party's photo, as shown in FIG. 10 and FIG. 11, at the position of the analyzed audio information.

In this case, referring to FIG. 10, the controller 180 displays a correspondent party's photo 15B set within the searched contact information 10 at the position of the analyzed audio information on the screen and is able to display the first to fourth icons 11B, 11C, 13B and 14B in a manner of arranging them next to four edges of the correspondent party's photo 15B, respectively.

Moreover, referring to FIG. 11, the controller 180 displays a rotatable 3D polygonal shape at the position of the analyzed audio information on the screen and is able to display the first to fifth icons 11B, 11C, 13B, 14B and 15B in a manner of arranging then faces of the 3D polygonal shape, respectively.

Meanwhile, if the contact information selected by the step S270 and the procedure shown in FIG. 10 or FIG. 11, the controller 180 performs an operation for the communication with the selected contact information by controlling the wireless communication unit 110 [S290].

The step S290 is explained in detail with reference to FIGS. 9 to 16 as follows.

Figure 9:
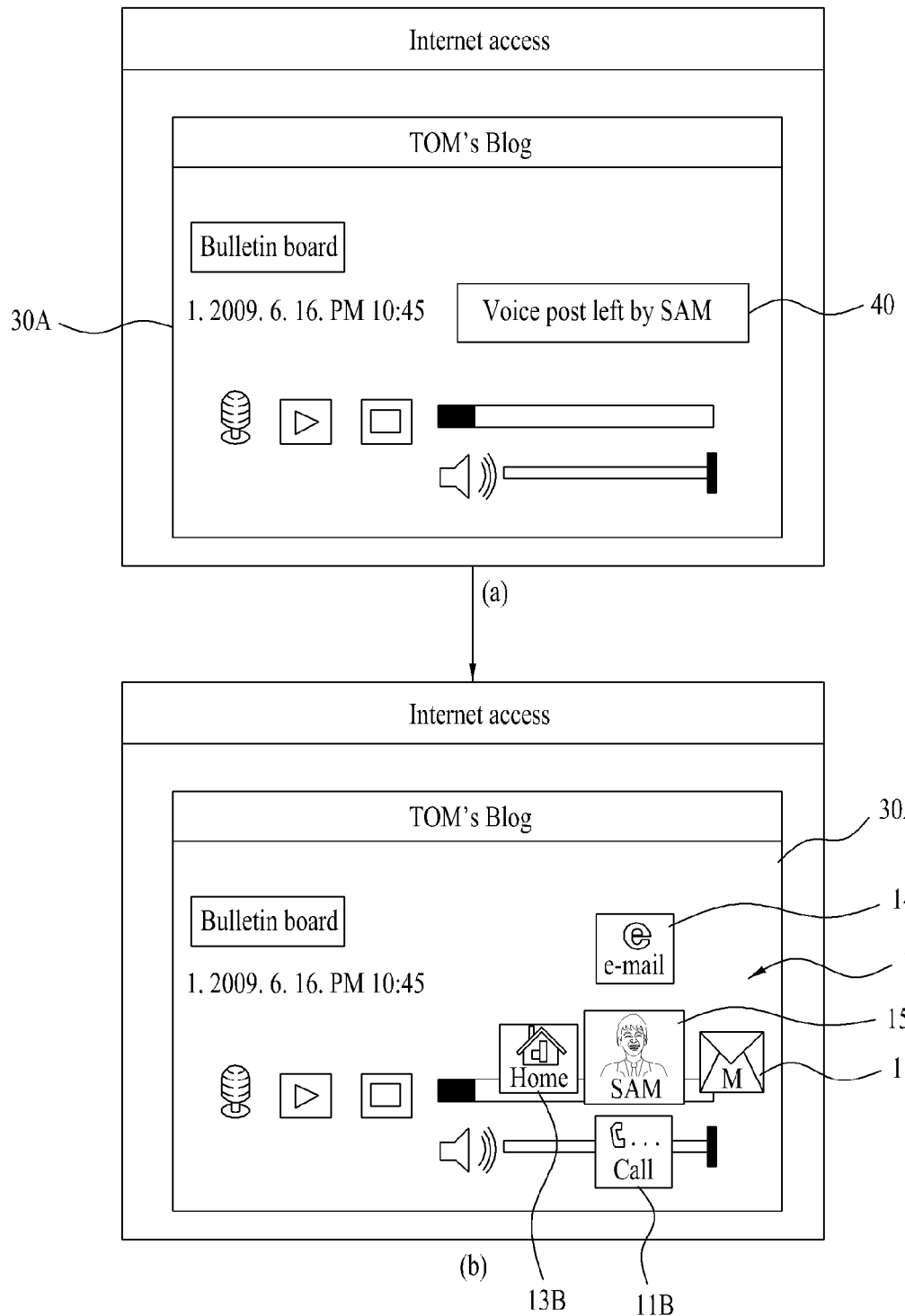

First of all, in (a) of FIG. 9, shown is a blog screen 30A of the person 'TOM' with which the voice post 40 of the correspondent party 'SAM' is registered as the audio information.

Referring to (a) of FIG. 9, if a command for outputting the voice post 40 of the correspondent party 'SAM' is inputted by a user, the controller 180 outputs the voice post 40 of the correspondent party 'SAM' via the audio output module 152 and recognizes the voice post 40 outputted via the voice recognizing module 182.

Subsequently, the controller 180 searches the contact informations within the memory 160 for the contact information 10 to which the voice information matching the recognized voice post 40 is tagged. The controller 180 then displays the searched contact information 10, as shown in (b) of FIG. 9, at the position with which the voice post 40 is registered.

In this case, referring to (b) of FIG. 9, the contact information 10 includes a first icon 11B for a call connection to the correspondent party's (SAM's) phone number, a second icon 11C for sending a message to the correspondent party's (SAM's) phone number, a third icon 13B for accessing the correspondent party's (SAM's) home page address, a fourth icon 14B for sending an email to the correspondent party's (SAM's) email address, and a fifth icon 15B indicating the correspondent party's (SAM's) photo.

Figure 12:
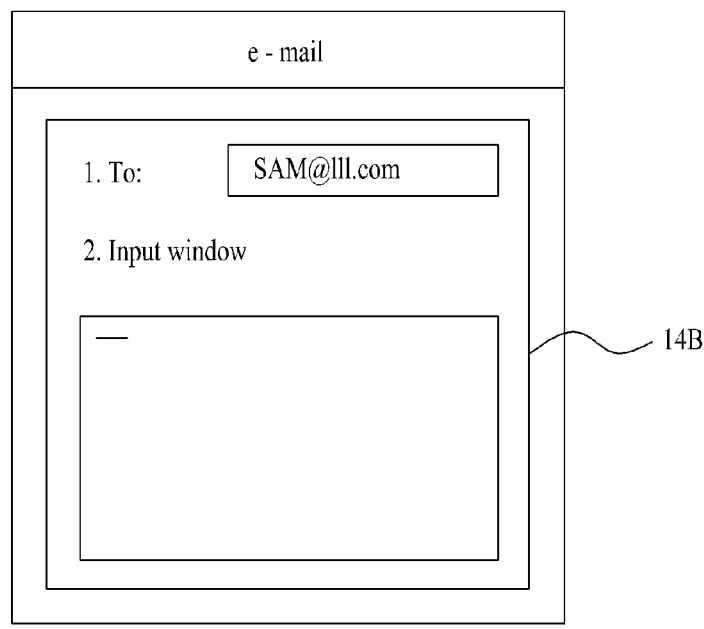

In particular, if the fourth icon 14B is selected by the user, referring to FIG. 12, the controller 180 displays an email writing window for sending an email to the correspondent party's (SAM's) email address and then sends the email written through the email writing window to the correspondent party (SAM) by controlling the wireless communication unit 110.

Figure 13:
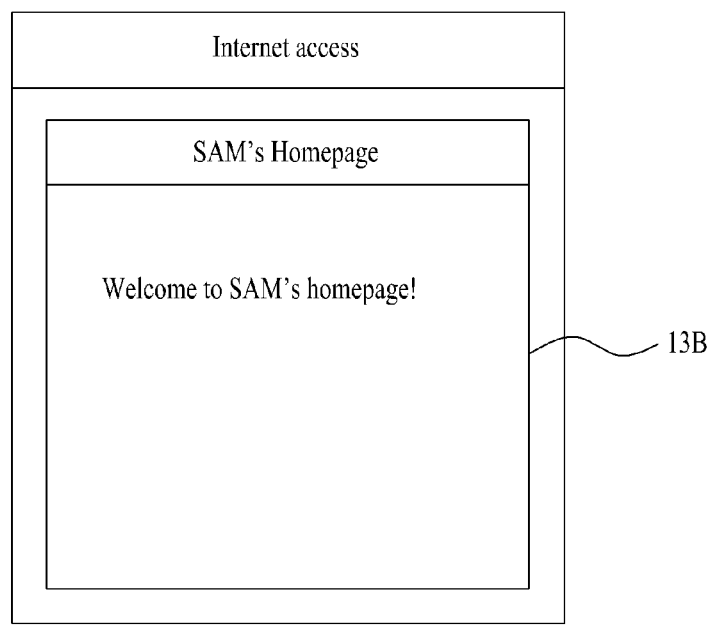

If the third icon 13B is selected by the user, referring to FIG. 13, the controller 180 accesses the correspondent party's (SAM's) homepage or blog address by controlling the wireless communication unit 110.

Figure 14:
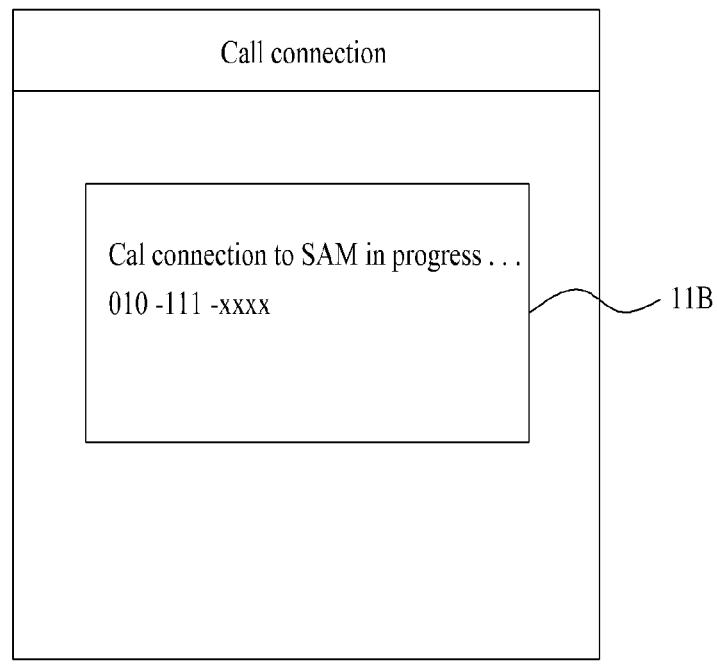

If the first icon 11B is selected by the user, referring to FIG. 14, the controller 180 connects a call to the correspondent party's (SAM's) phone number by controlling the wireless communication unit 110.

Figure 15:
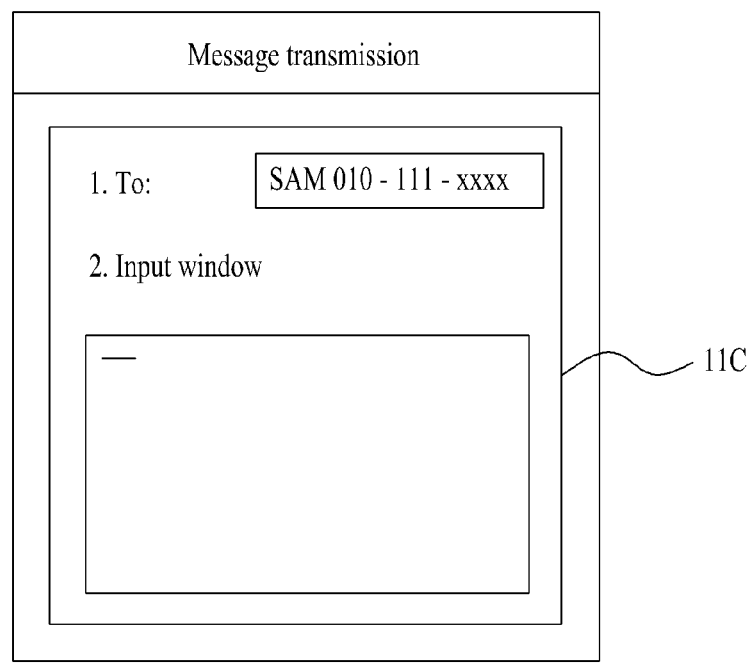

If the second icon 11C is selected by the user, referring to FIG. 15, the controller 180 displays a message writing window for sending a message to the correspondent party's (SAM's) phone number and then sends the message written via the message writing window to the correspondent party (SAM) by controlling the wireless communication unit 110.

In (a) of FIG. 16, shown is that a state of outputting a voice of a first correspondent party (SAM), a voice of a second correspondent party (Alice) and voice information of a third correspondent party (KIM) are outputted with is displayed within a UCC video screen 30B.

The controller recognizes the outputted voice of the first correspondent party (SAM), the outputted voice of the second correspondent party (Alice) and the outputted voice information of the third correspondent party (KIM) via the voice recognizing module 182.

Subsequently, the controller 180 searches the contact informations provided to the memory 160 for contact informations to which the voice informations matching the voices of the first to third correspondent parties 40, 50 and 60 are tagged, respectively. Referring to (b) of FIG. 16, the controller 180 is able to display the searched contact informations of the first to third correspondent parties 40, 50 and 60 within the UCC video screen 30B.

In this case, if the user selects the icon 44 for the call connection to the first correspondent party 40 and the icon 54 for the call connection to the second correspondent party 50, the controller 180 connects a multi-party call with the first and second correspondent parties 40 and 50 by controlling the wireless communication unit 110.

In particular, if the call connection icons with a plurality of correspondent parties are selected, the controller 180 connects the multi-party call with the correspondent parties corresponding to the selected call connection icons.

If the user selects the icon 41 for the message transmission to the first correspondent party 40 and the icon 55 for the message transmission to the second correspondent party 50, the controller 180 displays a message writing window for sending the messages to the phone numbers of the first and second correspondent parties 40 and 50 and then sends the message written via the message writing window to the first and second correspondent parties 40 and 50 by controlling the wireless communication unit 110.

If the user selects the icon 42 for the email transmission to the first correspondent party 40 and the icon 52 for the email transmission to the second correspondent party 50, the controller 180 displays an email writing window for sending the emails to the email addresses of the first and second correspondent parties 40 and 50 and then sends the email written via the email writing window to the first and second correspondent parties 40 and 50 by controlling the wireless communication unit 110.

If the user selects the icon 43 for the homepage access to the first correspondent party 40 and the icon 53 for the homepage access to the second correspondent party 50, the controller 180 accesses the homepage addresses of the first and second correspondent parties 40 and 50 by controlling the wireless communication unit 110.

In doing so, the controller 180 divides the current screen into a first region and a second region and is then able to display homepage screens of the first and second correspondent parties 40 and 50 on the first and second regions, respectively.

Accordingly, the present invention provides the following effects and/or advantages.

First of all, according to at least one of embodiments of the present invention, on a screen of a website or the like with which a voice post or reply is registered, speaker information corresponding to the voice reply or post is analyzed. Contact information to which voice information matching the analyzed speaker information is tagged is then displayed on the website screen. Therefore, the present invention facilitates a user to recognize who has left the voice reply or post on the website screen And, the user is able to quickly contact the person who left the voice reply or post using the contact information.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
 a wireless communication unit;
 a display unit configured to display a screen including information about at least one audio data;
 an audio output unit configured to output the at least one audio data;
 a memory configured to store a plurality of contact information of at least one correspondent party, the plurality of contact information including at least one voice feature vector value for recognizing a voice of the at least one correspondent party, respectively; and
 a controller configured to:
  analyze a voice feature vector value of the at least one audio data,
  search the memory for at least one contact information including a specific voice feature vector value matching the analyzed voice feature vector value, and
  control the display unit to display the searched contact information.

2. The mobile terminal of claim 1, wherein the at least one audio data is included in a website screen, a music play screen, or a video play screen.

3. The mobile terminal of claim 2, wherein the at least one audio data included in the website screen includes a voice post of the correspondent party, a voice replay of the correspondent party, or a UCC (user created contents) video including a voice of the correspondent party.

4. The mobile terminal of claim 1, wherein the analyzed voice feature vector value is a voice feature vector value of a voice directly recorded by the correspondent party, a voice feature vector value of a voice recorded in the course of a call with the correspondent party, a voice feature vector value of a correspondent party's voice extracted from a currently played music file, or a voice feature vector value of a correspondent party's voice extracted from a currently played video file.

5. The mobile terminal of claim 1, wherein if the memory does not include the specific voice feature vector value matching the analyzed voice feature vector value, the controller accesses a web via the wireless communication unit and then searches the accessed web for the contact information including the specific voice feature vector value matching the analyzed voice feature vector value.

6. The mobile terminal of claim 1, wherein if a specific contact information among the displayed contact information corresponding to a specific contact is selected, the controller controls the wireless communication unit to connect to the specific contact.

7. The mobile terminal of claim 1, wherein the controller controls the display unit to display at least one icon indicating the searched at least one contact information including the matching voice feature vector value.

8. The mobile terminal of claim 7, wherein the controller combines at least one image corresponding to the searched at least one contact information that includes the matching voice feature vector value, with the at least one icon displayed on the display unit, and then controls the display unit to display the combined at least one image with the at least one icon, respectively.

9. The mobile terminal of claim 8, wherein, while the at least one image is displayed, the controller controls the display unit to display the at least one icon next to edges of the at least one image, respectively.

10. The mobile terminal of claim 1, wherein if a plurality of contact information of different types is stored in the memory, the controller controls the display unit to display icons indicating the different types of the plurality of contact information.

11. The mobile terminal of claim 9, wherein the controller controls the display unit to display the icons on facets of a rotatable 3D polygonal shape, respectively.

12. The mobile terminal of claim 9, wherein a function including a call function, a message send function, an email send function, a homepage access function, or a blog access function is assigned to each of the icons.

13. A method of controlling a mobile terminal, the method comprising:
 displaying, via a display unit of the mobile terminal, a screen including information about at least one audio data;
 outputting, via an audio output unit of the mobile terminal, the at least one audio data;
 storing, via a memory of the mobile terminal, a plurality of contact information of at least one correspondent party, the plurality of contact information including at least one voice feature vector value for recognizing a voice of the at least one correspondent party, respectively;
 analyzing, via a controller of the mobile terminal, a voice feature vector value of the at least one audio data;
 searching, via the controller, the memory for at least one contact information including a specific voice feature vector value matching the analyzed voice feature vector value; and
 displaying, via the display unit, the searched contact information.

* * * * *